United States Patent
Linkner, Jr. et al.

(10) Patent No.: US 6,453,930 B1
(45) Date of Patent: *Sep. 24, 2002

(54) CONTROL VALVES FOR A HYDRAULIC CONTROL UNIT AND METHOD OF ASSEMBLY

(75) Inventors: Herbert L. Linkner, Jr., Dexter; Wendell D. Tackett, Ann Arbor, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,541

(22) Filed: Sep. 9, 2000

(51) Int. Cl.$^7$ .................. F16K 43/00; F16K 31/06; F16K 51/00; F15B 13/044
(52) U.S. Cl. .................. 137/15.18; 137/315.03; 137/270; 137/271; 251/129.02; 251/129.15; 303/119.2
(58) Field of Search .................. 137/15.17, 15.18, 137/315.03, 596.17, 269, 270, 271; 251/129.02, 129.15; 303/119.2

(56) References Cited

U.S. PATENT DOCUMENTS

| | | | |
|---|---|---|---|
| 3,013,768 A | 12/1961 | Mastra | 251/129.15 |
| 3,307,585 A | 3/1967 | Schilling et al. | 137/625.66 |

(List continued on next page.)

FOREIGN PATENT DOCUMENTS

| | | |
|---|---|---|
| DE | 4031885 A1 | 8/1990 |
| WO | WO 98/24669 | 6/1998 |

*Primary Examiner*—George L. Walton
(74) *Attorney, Agent, or Firm*—MacMillan, Sobanski & Todd, LLC

(57) ABSTRACT

A method for assembling a hydraulic control unit of a vehicular brake system includes the following steps of: providing a sleeve having a closed end; sliding a spring over an armature to form an armature/spring subassembly; orientating the armature subassembly to produce a normally open valve or a normally closed valve; sliding the oriented armature/spring subassembly into the sleeve; sliding a valve seat into the sleeve; crimping a portion of the sleeve onto the valve seat to form a sleeve/valve seat subassembly; inserting the sleeve/valve seat subassembly into a bore of a housing. Two additional steps can be combined with the above listed steps to provide a method of assembling the control valve subassemblies described above on a hydraulic control unit. The additional steps include: inserting the sleeve/valve seat subassembly into a bore in a housing; and pressing a coil assembly about the sleeve.

12 Claims, 4 Drawing Sheets

U.S. PATENT DOCUMENTS

| | | | |
|---|---|---|---|
| 3,346,004 A | * 10/1967 | Costello | 137/271 |
| 3,829,060 A | * 8/1974 | Von Lewis | 251/129.02 |
| 4,286,626 A | * 9/1981 | Leiber | 251/129.15 |
| 4,756,331 A | * 7/1988 | Stegmaier | 137/271 |
| 4,901,974 A | 2/1990 | Cook et al. | 251/129.15 |
| 4,951,703 A | * 8/1990 | Brehm et al. | 251/129.15 |
| 4,967,786 A | 11/1990 | DuHack | 251/129.15 |
| 5,002,835 A | 3/1991 | Nijland et al. | 428/577 |
| 5,088,520 A | * 2/1992 | Haynes et al. | 137/270 |
| 5,114,116 A | * 5/1992 | Muller et al. | 251/129.15 |
| 5,135,027 A | * 8/1992 | Miki et al. | 251/129.15 |
| 5,143,345 A | * 9/1992 | Miki et al. | 251/129.15 |
| 5,246,199 A | 9/1993 | Numoto et al. | 251/129.15 |
| 5,261,731 A | * 11/1993 | Yogo et al. | 251/129.02 |
| 5,364,067 A | * 11/1994 | Linkner, Jr. | 251/129.15 |
| 5,393,132 A | * 2/1995 | Yogo et al. | 251/129.15 |
| 5,402,093 A | 3/1995 | Gibas et al. | 251/129.15 |
| 5,439,279 A | * 8/1995 | Linkner, Jr. et al. | 251/129.15 |
| 5,467,961 A | 11/1995 | Sausner et al. | 251/129.15 |
| 5,476,243 A | * 12/1995 | Oehler et al. | 251/129.02 |
| 5,605,386 A | * 2/1997 | Ziegler et al. | 251/129.02 |
| 5,669,406 A | * 9/1997 | Gluf, Jr. | 137/270 |
| 5,673,980 A | * 10/1997 | Schwarz et al. | 251/129.02 |
| 5,681,098 A | * 10/1997 | Ganzel et al. | 251/129.15 |
| 5,709,370 A | 1/1998 | Kah, Jr. | 251/129.15 |
| 5,775,670 A | 7/1998 | Osterbrink | 251/129.15 |
| 5,791,747 A | * 8/1998 | Sorensen et al. | 251/129.15 |
| 5,795,038 A | 8/1998 | Fuller et al. | 303/119.2 |
| 5,879,060 A | * 3/1999 | Megerle et al. | 251/129.02 |
| 6,065,734 A | * 5/2000 | Tackett et al. | 251/129.15 |
| 6,206,038 B1 | 3/2001 | Klein et al. | 137/596.17 |
| 6,213,572 B1 | 4/2001 | Linkner, Jr. et al. | 303/119.2 |
| 6,302,499 B1 | 10/2001 | Linkner, Jr. et al. | 303/119.2 |
| 6,345,870 B1 | 2/2002 | Linkner, Jr. et al. | 303/119.2 |

* cited by examiner

CONTROL VALVES FOR A HYDRAULIC CONTROL UNIT AND METHOD OF ASSEMBLY

BACKGROUND OF THE INVENTION

This invention relates in general to vehicular brake systems, and in particular is concerned with control valves mounted in a hydraulic control unit of an electronically controlled brake system.

Electronically-controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly slides the armature from the biased open or closed position to a closed or open position, respectively.

Control valves mounted in an HCU are actuated by an electronic control module to provide desired braking functions such as anti-lock braking, traction control, and vehicle stability control.

SUMMARY OF THE INVENTION

This invention relates to control valves mounted in a hydraulic control unit of a vehicular brake system. Each control valve can be configured as a normally open valve or a normally closed valve. Identical components are shared between the two configurations. A method of economically assembling the control valves as subassemblies reduces conventional costs associated with such subassemblies. A method of assembling the control valves on a hydraulic control unit reduces conventional costs associated with such assembly.

In a preferred embodiment, a method for assembling a hydraulic control unit of a vehicular brake system includes the following steps of: providing a sleeve having a closed end; sliding a spring over an armature to form an armature/spring subassembly; orientating the armature/spring subassembly to produce a normally open valve or a normally closed valve; sliding the oriented armature/spring subassembly into the sleeve; sliding a valve seat into the sleeve; crimping a portion of the sleeve onto the valve seat to form a sleeve/valve seat subassembly; inserting the sleeve/valve seat subassembly into a bore of a housing.

Two additional steps can be combined with the above listed steps to provide a method of assembling the control valve subassemblies described above on a hydraulic control unit. The additional steps include: inserting the sleeve/valve seat subassembly into a bore in a housing; and pressing a coil assembly about the sleeve.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
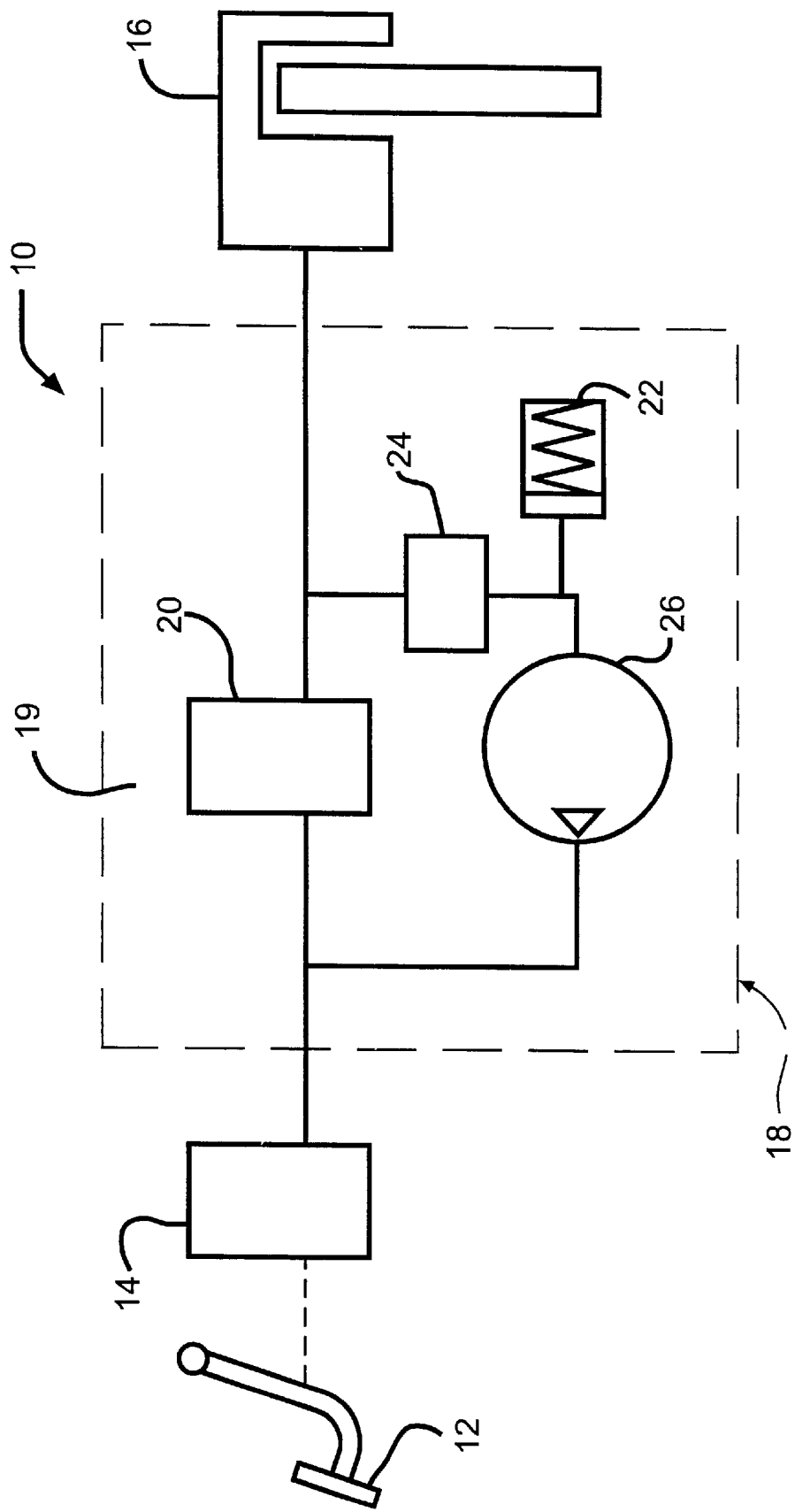
FIG. 1 is a schematic diagram of a vehicular braking system according to the present invention illustrating a hydraulic control unit having a normally open control valve, a normally closed control valve, an accumulator, and a pump.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles, including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 connected between the low pressure accumulator 22 and an inlet to control valve 20. The HCU 18 may also include other fluid flow devices such as an attenuator, restricted orifices, and check valves (none of which are illustrated), depending upon the system design. Control valve 20 is preferably formed as a solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

Figure 2:
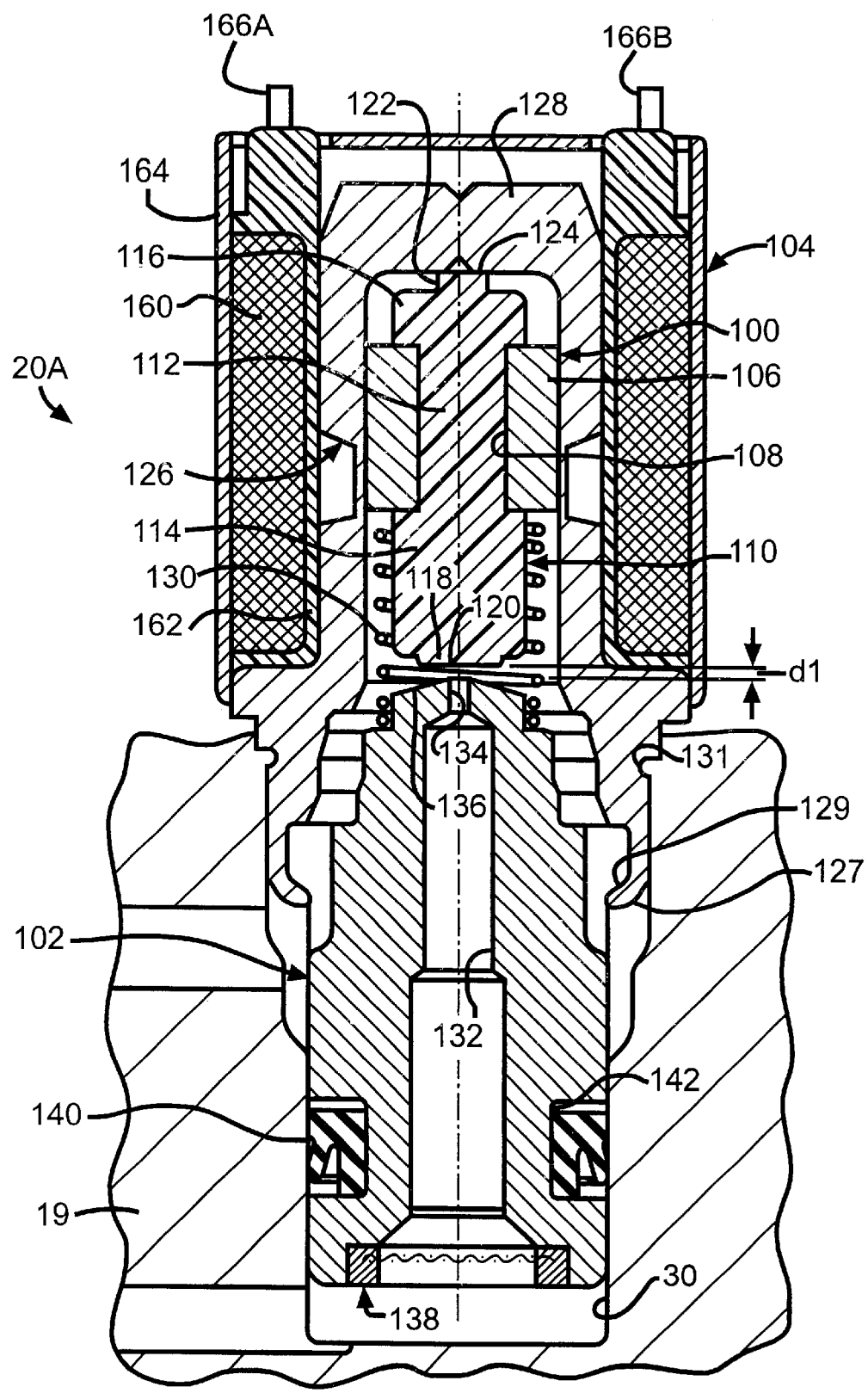
FIG. 2 is a sectional view through the hydraulic control unit of FIG. 1 illustrating a first embodiment of the normally open control valve according to this invention.

A sectional view of a preferred embodiment of the isolation valve 20 is indicated generally at 20A in FIG. 2. The isolation valve 20A is received in a bore 30 formed in the housing 19. As described below in detail, the isolation valve 20A includes an armature 100 biased away from a valve seat 102 when the valve 20A is not energized. When a coil assembly 104 is energized to produce an electromagnetic field, the armature 100 is pulled toward the valve seat 102 to close fluid flow through the valve 20A.

The armature 100 is formed as a subassembly and then assembled with the remainder of the valve 20A. The armature 100 includes an armature core 106 formed as a hollow cylinder from a ferromagnetic material. Preferably, each end of the armature core 106 is a planar surface. The armature core 106 includes a longitudinal (preferably axial) passage 108. The longitudinal passage 108 can be formed as a bore. Preferably, the longitudinal passage 108 is formed with a constant diameter.

The armature 100 also includes an armature body 110. Preferably, the armature body 110 is formed from a molded material such as polyphenylene sulfide (PPS) or polypthalamide (PPA). The armature core 106 can be placed in a mold. Then the desired material can be injected into the mold to form the armature body 110. The armature body 110 includes a central section 112 that fills the longitudinal passage 108 of the armature core 106. A first end section 114 and a second end section 116 are formed at opposite ends of the central section 1 12. Each of the first and second end sections 1 14 and 1 16 extend beyond an end surface of the armature core 106 a predetermined distance. Each of the first and second end sections 114 and 116 has an outer diameter less than an outer diameter of the armature core 106. The outer diameters of the first and second end sections 114 and 116 are greater than an outer diameter of the central section 112. The first end section 114 preferably terminates in a projecting stub 118. The stub 118 preferably terminates in a planar end surface 120. The second end section 114 preferably terminates in a projecting stub 122. The stub 122 preferably terminates in a planar end surface 124. This formation and structure can be described as an armature core 106 having an overmolded armature body 110.

The armature 100 is slidably received in a sleeve or flux tube 126 having a closed end 128. A spring 130 biases the armature 100 away from the valve seat 102. An annular portion 127 adjacent an open end of the sleeve 126 is crimped onto an annular flange 129 formed on the valve seat 102. The combined sleeve 126 and valve seat 102 containing the armature 100 is retained in the bore 30 by any desired means including material of the housing 19 forced into a groove 131 formed in the outer surface of the sleeve 126.

The valve seat 102 includes a longitudinal fluid passage 132 that terminates in a reduced diameter opening 134. A seat 136 is formed on an outer surface of the valve seat 102. The planar end surface 120 of stub 118 acts as a valve sealing element and engages the seat 136 when the armature 100 moves downwardly. When the stub 118 engages the seat 136, flow through fluid passage 132 and opening 134 is blocked. When the coil assembly 104 is not energized, the planar end surface 120 is spaced a distance d1 from the seat 136. At this position, the planar end surface 124 engages an inner surface of the closed end 128.

A filter assembly 138 is provided adjacent an inlet of the fluid passage 132. A lip seal 140 is provided in a groove 142 formed in an outer surface of the valve seat 102.

The armature 100 provides a responsive, economical element that reciprocates in the sleeve 126 during operation of the valve 20A to provide desired braking responses in the system 10.

Figure 3:
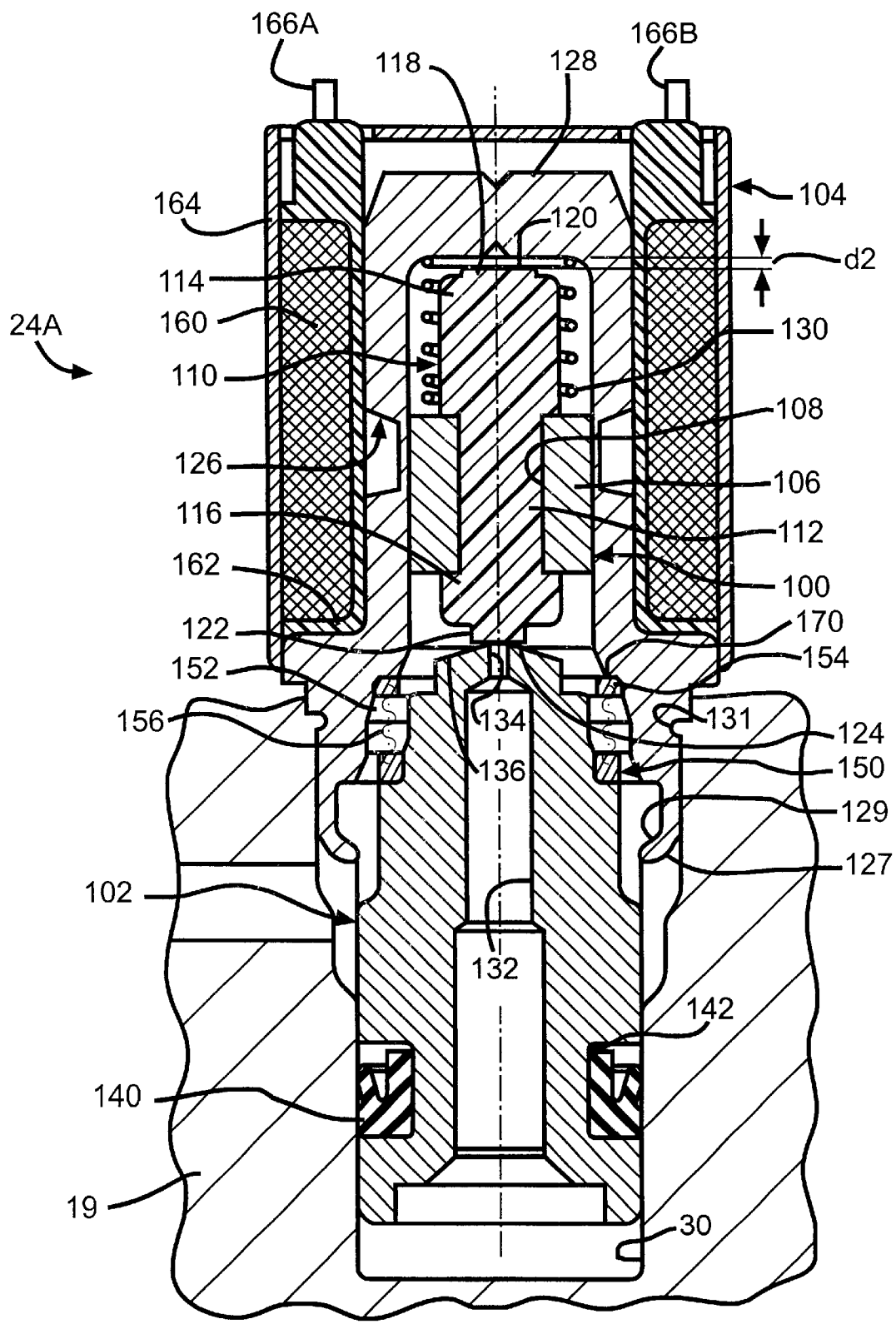
FIG. 3 is a sectional view through the hydraulic control unit of FIG. 1 illustrating a first embodiment of the normally closed control valve according to this invention.

A sectional view of a preferred embodiment of the dump valve 24 is indicated generally at 24A in FIG. 3. The dump valve 24A is received in a bore 32 formed in the housing 19. Preferably, the dump valve 24A includes many components identical to the isolation valve 20 of FIG. 2, including an armature 100, a coil assembly 104, a sleeve 126, and a spring 130. When the coil assembly 104 is not energized, the armature 100 is urged into contact with a valve seat 103 by the spring 130 to block fluid flow through the dump valve 24A. When the coil assembly 104 is energized, the armature 100 is urged toward a closed end 128 of the sleeve to permit fluid flow through the dump valve 24A.

As stated above, the armature 100 in dump valve 24A is preferably identical to armature 100 in isolation valve 20A of FIG. 2. Preferably, the armature 100 in dump valve 24A is inverted (rotated 180 degrees) when compared to the orientation of armature 100 in isolation valve 20A.

Armature 100 in dump valve 24A includes an armature core 106 and an overmolded armature body 110. A planar end surface 124 of stub 122 of the second end section 116 is engaged with a seat 137 formed on the valve seat 103 by a spring 130. When the coil assembly 104 is energized, the armature 100 is pulled away from the valve seat 102 so that fluid can flow through a fluid passage 132 and a reduced diameter opening 134 in the valve seat 102. When the coil assembly 104 is not energized, planar end surface 120 is spaced a predetermined distance d2 from an inner surface of the closed end 128.

An internal band filter 150 is placed between the sleeve 126 and the valve seat 103. Preferably, the band filter 150 is received in a pocket 152 formed between the sleeve 126 and the valve seat 103. The band filter 150 includes a ring 154 and a filter material 156. The band filter 152 is less prone to damage during assembly and installation of the valve 24A after the sleeve 126 has been crimped onto the valve seat 103.

The components of control valves 20A and 24A permit an advantageous method of assembling the valves 20A and 24A. Furthermore, the identical components used for valves 20A and 24A provide an advantageous method of assembly the hydraulic control unit 18.

The coil assembly 104 is formed as a subassembly. A coil 160 is wound on a bobbin 162. The coil 160 and bobbin 162 are received in a casing 164.

Terminal ends 166A and 166B are received through respective openings in the casing 164.

As described above, the armature 100 is formed as a subassembly. The armature 100 includes the armature core 106 and the overmolded armature body 110.

The sleeve 126 is formed as a single piece. The sleeve 126 includes a closed end 128 and a bendable annular portion 127 adjacent an open end.

The valve seat 102 is formed as a single piece. A fluid passage 132 terminating in a reduced diameter opening 134 is formed in the valve seat 102. A lip seal 140 is received in a groove 142 provided in an outer surface of the valve seat 102.

Figure 4:
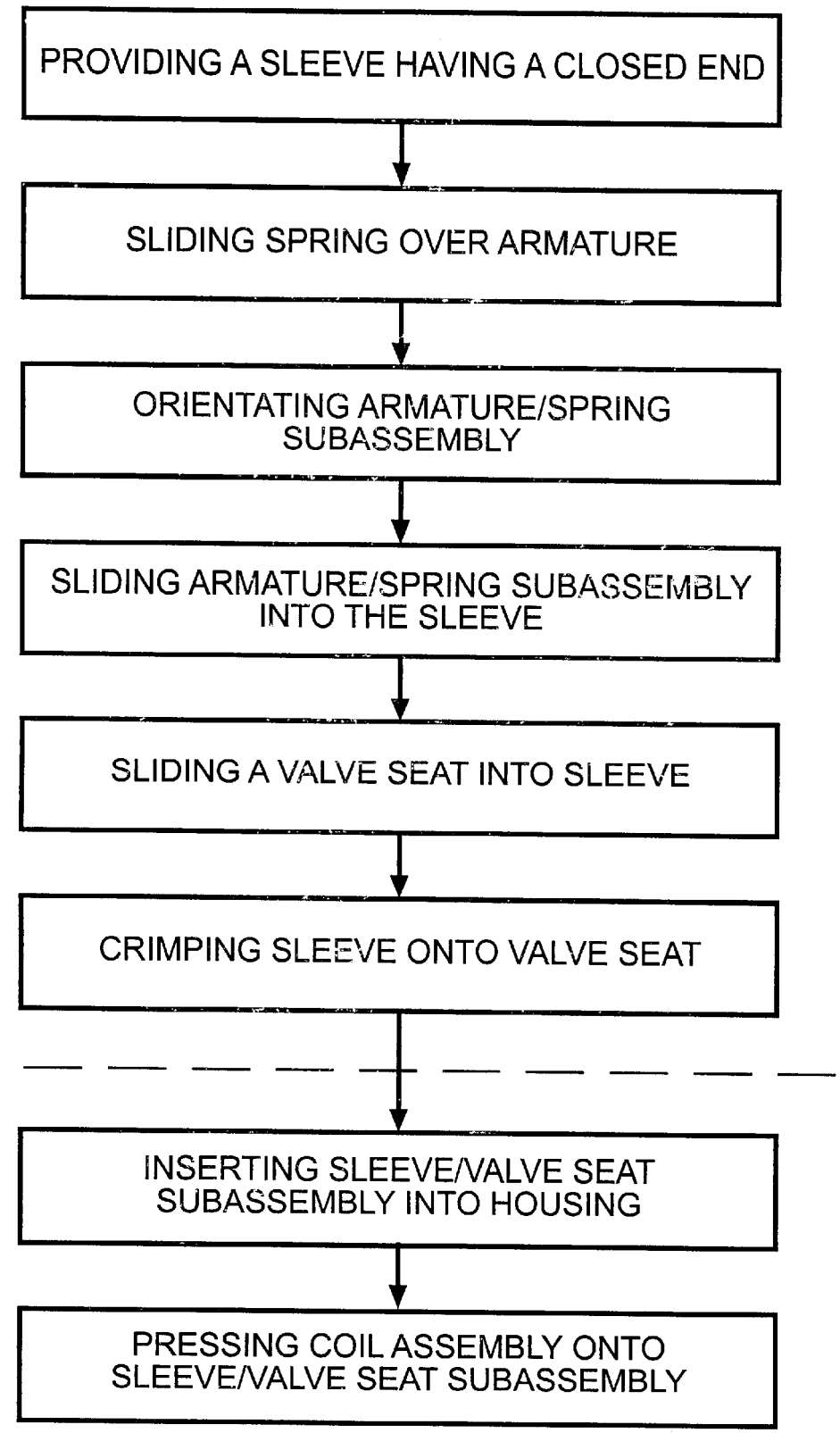
FIG. 4 is a schematic block diagram of a method of assembling control valves and assembling the control valves on a hydraulic control unit according to this invention.

An economical method of assembling the above components and subassemblies is illustrated in the block diagram of FIG. 4. This method can be referred to as "drop-in" assembly. Steps one through six describe a method for forming sleeve/valve seat subassembly of a control valve. Steps seven and eight, when added to steps one through six, describe a method for assembling a control valve on a housing 19 of a hydraulic control unit 18.

A first step is to provide the sleeve 126. The sleeve 126 can be oriented so that the closed end 128 is below the annular portion 127.

A second step is to slide the coil spring 130 over the first end section of the armature 100 to form an armature/spring subassembly. Thus, the inner diameter of the coil spring 130 is greater than an outer diameter of the first end section 114.

A third step is to orient the armature/spring subassembly in a desired orientation, based on whether a normally open or normally closed valve is to be assembled. If a normally open valve is desired, the armature/spring subassembly is oriented so that planar end surface 124 is directed to an inner surface of the closed end 128. If a normally closed valve is desired, the armature/spring subassembly is oriented so that planar end surface 120 and coil spring 130 are directed to an inner surface of the closed end.

A fourth step is to slide the armature/spring subassembly into the open end of the sleeve 126. The armature core 106 slides along an inner surface of the sleeve 126. During operation of the valves 20A and 24A, lateral magnetic gaps are maintained between the armature 100 and an inner surface of the sleeve 126.

A fifth step is to slide the valve seat 102 into the open end of the sleeve 126. The valve seat 102 is oriented so that the seat 136 of the valve seat 134 is directed to the armature/coil subassembly. If desired, the lip seal 140 can be positioned in groove 142 prior to the insertion of the valve seat 102 into the sleeve 126.

If a normally closed valve is desired, the band filter 150 is slide over a leading end of the valve seat 102 prior to its insertion. Alternatively, the band filter 150 can be positioned on a step 170 in the sleeve 126 prior to the insertion of the valve seat 102.

A sixth step is to crimp the annular portion 127 about the flange 129 on the valve seat 102. The crimping step secures the sleeve 126 onto the valve seat 102.

At this point, the sleeve/valve seat subassembly is completed. These subassemblies can be mounted in the housing 19 as part of the assembly of the HCU 18. Two additional steps complete the assembly of the control valves 20A and 24A.

A seventh step is to insert the sleeve/valve seat subassembly into a bore in the housing 19.

An eighth step is to press the coil assembly 104 assembly about the sleeve 126. Preferably, the coil assembly 104 is retained by an interference fit. However, welding can also be used to retain the coil assembly 104 onto the sleeve 126.

Equipment used to assembly the isolation valve 20A can also be used to assembly the dump valve 24A. The use of common equipment can significantly reduce the costs for assembly the hydraulic control unit 18.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for assembling a control valve for a hydraulic control unit comprising the steps of:
    providing a sleeve having a closed end;
    providing an armature with two opposed ends, each of the opposed ends having a valve seat engaging surface defined thereon;
    sliding a spring over the armature to form an armature/spring subassembly;
    orientating the armature/spring subassembly to produce a normally open valve with one end of the spring engaging a portion of the armature and the other end of the spring engaging the valve seat, or, by positioning the armature/spring subassembly in an opposite orientation, to produce a normally closed valve with the one end of the spring engaging the portion of the armature and the other end of the spring engaging the closed end of the sleeve;
    sliding the oriented armature/spring subassembly into the sleeve;
    sliding a valve seat into the sleeve; and
    crimping a portion of the sleeve onto the valve seat.

2. The method of assembling a control valve as specified in claim 1 including the step of providing a band filter between the valve seat and the sleeve prior to the step of sliding the valve seat into the sleeve when a normally closed valve is produced.

3. The method of assembling a control valve as specified in claim 1 wherein an inner diameter of the spring is larger than an outer diameter of the armature.

4. The method of assembling a control valve as specified in claim 3 wherein the armature includes an end section that receives the spring.

5. The method of assembling a control valve as specified in claim 1 including the step of forming an armature as a subassembly as an armature core having an overmolded armature body prior to the step of sliding a spring onto the armature.

6. A method for assembling a hydraulic control unit comprising the steps of:
    providing a sleeve having a closed end;
    providing an armature with two opposed ends, each of the opposed ends having a valve seat engaging surface defined thereon;
    sliding a spring over the armature to form an armature/spring subassembly;
    orientating the armature/spring subassembly to produce a normally open valve with one end of the spring engaging a portion of the armature and the other end of the spring engaging the valve seat, or, by positioning the armature/spring subassembly in an opposite orientation, to produce a normally closed valve with the one end of the spring engaging the portion of the armature and the other end of the spring engaging the closed end of the sleeve;
    sliding the oriented armature/spring subassembly into the sleeve;
    sliding a valve seat into the sleeve;
    crimping a portion of the sleeve onto the valve seat to form a sleeve/valve seat subassembly; and
    inserting the sleeve/valve seat subassembly into a bore of a housing.

7. The method of assembling a hydraulic control unit as specified in claim 6 including the step of pressing a coil assembly onto the sleeve/valve seat subassembly after the step of inserting the sleeve/valve seat into a bore.

8. The method of assembling a hydraulic control unit as specified in claim 6 including the step of providing a band filter between the valve seat and the sleeve prior to the step of sliding the valve seat into the sleeve when a normally closed valve is produced.

9. The method of assembling a hydraulic control unit as specified in claim 6 wherein an inner diameter of the spring is larger than an outer diameter of the armature.

10. The method of assembling a hydraulic control unit as specified in claim 9 wherein the armature includes an end section that receives the spring.

11. The method of assembling a hydraulic control unit as specified in claim 6 including the step of forming an armature as a subassembly as an armature core having an overmolded armature body prior to the step of sliding a spring onto the armature.

12. A method for assembling a control valve for a hydraulic control unit comprising the steps of:
   a. providing a sleeve having a closed end;
   b. providing an armature with two opposite ends, one of the opposite ends having a first valve seat engaging surface defined thereon, the other of the opposite ends having a second valve seat engaging surface defined thereon;
   c. providing a spring;
   d. selectively assembling in the sleeve one of a subassembly for a normally open valve and a subassembly for a normally closed valve, the subassembly for a normally open valve consisting of the armature and the spring oriented with the first seat engaging surface of the armature adjacent the closed end of the sleeve and the armature interposed between the spring and the closed end of the sleeve, the subassembly for a normally closed valve consisting of the armature and the spring oriented with the second seat engaging surface of the armature adjacent the closed end of the sleeve and the spring interposed between the armature and the closed end of the sleeve; and
   e. affixing a valve seat to the sleeve in a position to be engaged by the second seat engaging surface of the armature if a subassembly for a normally open valve was assembled in step d, otherwise affixing the valve seat to the sleeve in a position to be engaged by the first seat engaging surface of the armature.

\* \* \* \* \*